(12) United States Patent
Hansen

(10) Patent No.: US 6,834,786 B2
(45) Date of Patent: Dec. 28, 2004

(54) PICKUP BED RACKS FOR BICYCLES AND METHODS

(76) Inventor: Clifton Hansen, 1005 Elk Mountain Dr., Green River, WY (US) 82435

( * ) Notice: Subject to any disclaimer, the term of this patent is extended or adjusted under 35 U.S.C. 154(b) by 129 days.

(21) Appl. No.: 10/368,831

(22) Filed: Feb. 19, 2003

(65) Prior Publication Data

US 2004/0159690 A1 Aug. 19, 2004

(51) Int. Cl.[7] .............................................. B60R 7/00
(52) U.S. Cl. ....................... 224/403; 224/556; 224/567; 224/924; 211/20; 296/43
(58) Field of Search ................................ 224/403, 556, 224/557, 558, 567, 924; 296/43; 211/20, 21, 22, 23, 24

(56) References Cited

U.S. PATENT DOCUMENTS

| 3,828,993 | A | * | 8/1974 | Carter | 224/323 |
| 5,037,019 | A | * | 8/1991 | Sokn | 224/558 |
| 5,092,504 | A | * | 3/1992 | Hannes et al. | 224/403 |
| 5,127,564 | A | * | 7/1992 | Romero | 224/403 |
| 5,265,897 | A | * | 11/1993 | Stephens | 280/293 |
| 5,611,472 | A | * | 3/1997 | Miller | 224/403 |
| 6,179,181 | B1 | * | 1/2001 | Johnson et al. | 224/405 |
| 6,398,091 | B1 | * | 6/2002 | Munoz et al. | 224/402 |

* cited by examiner

*Primary Examiner*—Stephen K. Cronin
(74) *Attorney, Agent, or Firm*—Lynn G. Foster

(57) ABSTRACT

A bicycle hauling rack for the bed of a pickup truck is disclosed. The rack increases the number of bicycles which can be hauled damage-free in the bed.

9 Claims, 6 Drawing Sheets

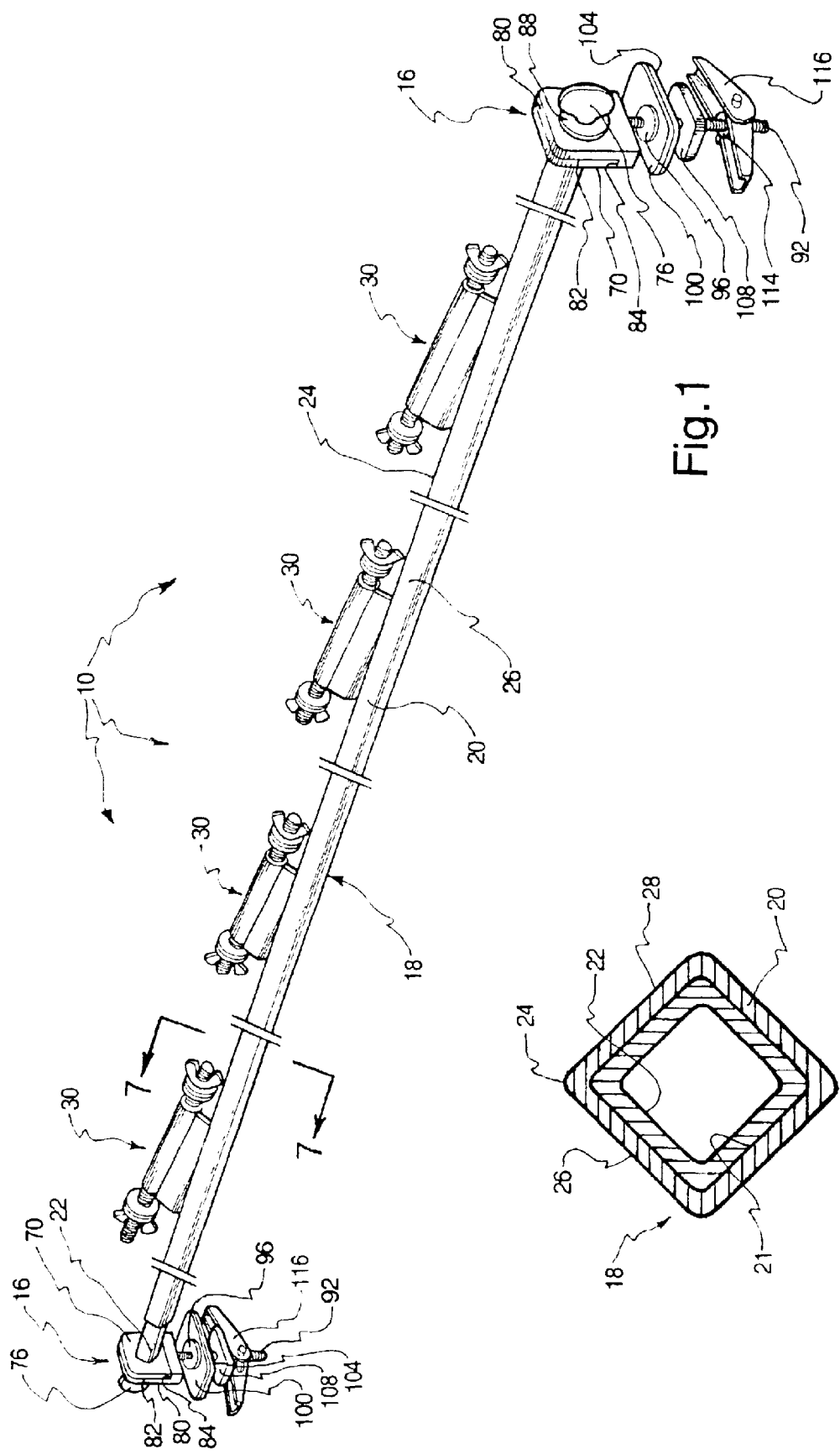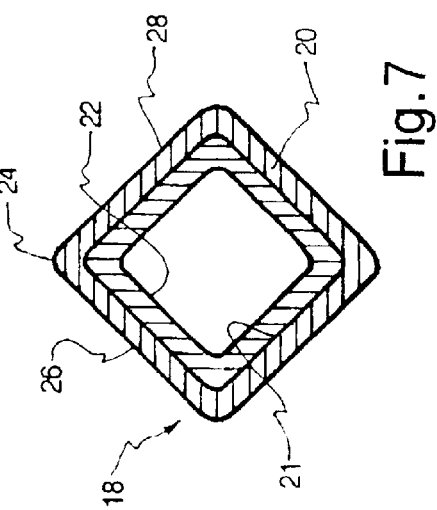

PICKUP BED RACKS FOR BICYCLES AND METHODS

FIELD OF INVENTION

The present invention relates generally to racks for bicycles and, more particularly, to racks for hauling a greater number of bicycles in the bed of a pickup truck, without damage.

BACKGROUND

In the past, hauling bicycles in the bed of a pickup truck has presented two types of problems, i.e.: (1) damage to the bicycle while loading, in transit and unloading, where no rack is used and the bicycles are placed one on top of another, and (2) restrictive hauling capacity using prior racks associated with the bed of a pickup truck.

BRIEF SUMMARY AND OBJECTS OF THE PRESENT INVENTION

In brief summary, the present invention overcomes or substantially alleviates problems of the prior art related to damage to and limited hauling capacity of bicycles in a rack associated with the bed of a pickup truck. The present invention provides an increased, damage-free hauling capacity for bicycles in the bed of a pickup truck using a unique rack, and related methods.

With the foregoing in mind, it is a primary object of the present invention to overcome or substantially alleviate problems of the prior art pertaining to hauling bicycles in the bed of a pickup truck.

Another object is the provision of novel racks, and related methods, damage-free, enlarged bicycle hauling capacity in the bed of a pickup truck.

These and other objects and features of the present invention will be apparent from the detailed description taken with reference to the accompanying drawings.

BRIEF DESCRIPTION OF THE DRAWINGS

FIG. 1 is a perspective of a bicycle rack for use in conjunction with the bed of a pickup truck, which rack embodies principles of the present invention;

FIG. 7 is a cross section taken along line 7—7 of FIG. 1.

DETAILED DESCRIPTION OF THE ILLUSTRATED EMBODIMENT

Figure 2:
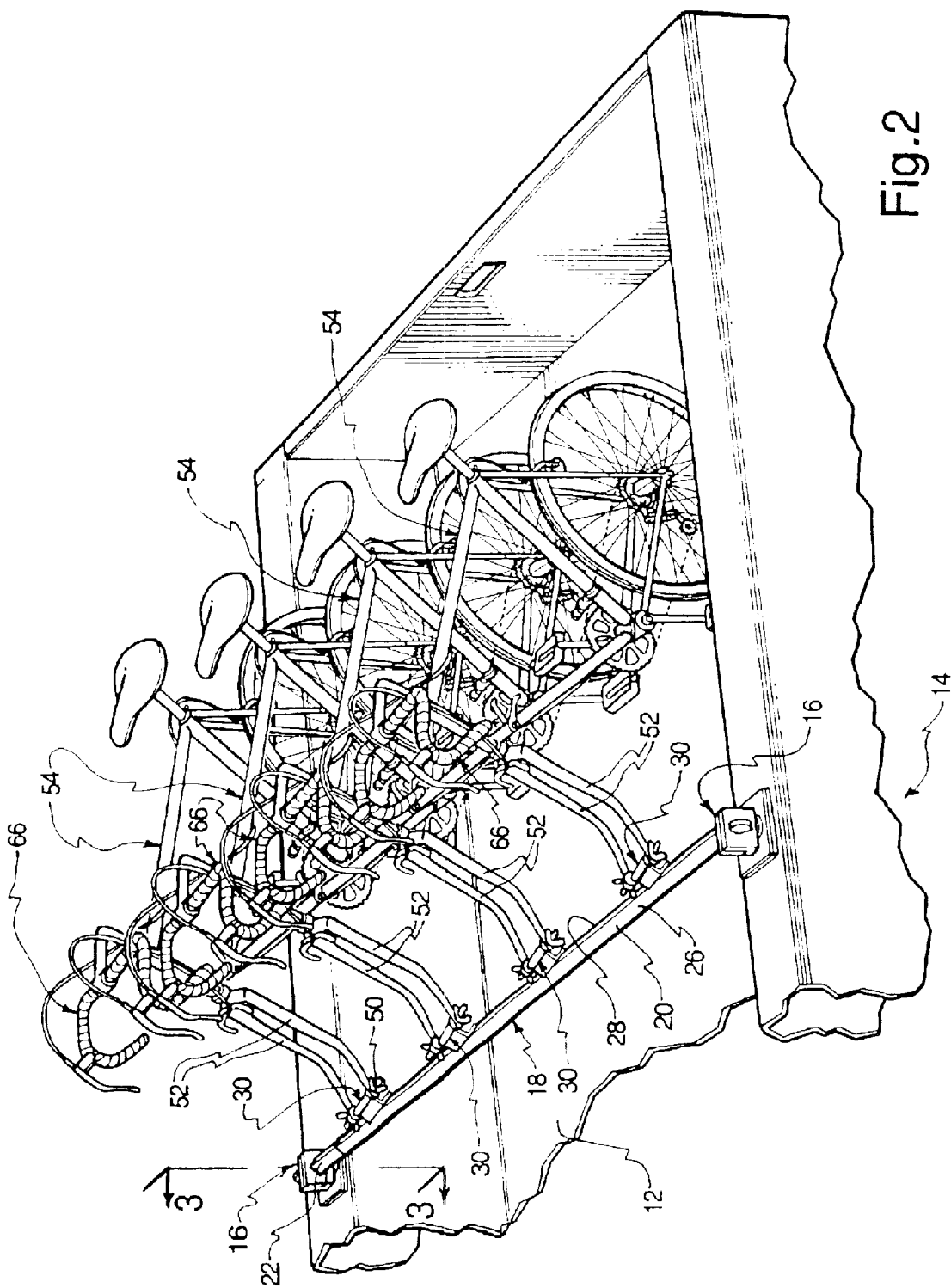
FIG. 2 is a perspective of the rack of FIG. 1 placed in association with the bed of a pickup truck, illustrating a greater number of bicycles mounted to the rack within the bed in a damage-free arrangement.

Reference is now made specifically to the drawings wherein like numerals are used to designate like parts throughout. A bicycle rack, generally designated 10, is best shown in FIGS. 1 and 2. Bicycle rack 10 functions to span across the bed 12 of a pickup truck 14, after being securely mounted at spaced, identical bed connectors, each generally designated at 16. The rack 10 comprises an elongated beam, generally designated 18, spanning between the connectors 16. Beam 18 comprises two telescopically-related members 20 and 22, which can be collectively extended or retracted to cause the rack 10 to fit any one of a number of pickup trucks having variously sized beds.

While the cross-sectional shape of the members 20 and 21 is not limited to any particular configuration, the illustrated members 20 and 22 are respectively shown as having a square or rectangular cross-section with dimensions such that member 22 can slide, on a close tolerance basis, into and out of the hollow interior 21 of member 20. See FIG. 7.

The members 20 and 22 are oriented in cross section so that one corner 24 constitutes a top edge of the beam 18, flanked by side surfaces 26 and 28, respectively.

A plurality of bike mounts, each generally designated 30, is secured to the beam 18 so as to be rigidly contiguous with surface 28. In the illustrated embodiment, each mount 30 is shown as being welded to the surface 28, although other forms of connection and fastening could be used, depending upon the circumstances and the best judgment of those skilled in the art. Other forms of attachment may be utilized when the materials from which the rack 10 is formed are other than metal. As can be noted from FIG. 1, each mount 30 is spaced from the next adjacent mount by an equal distance so that bicycles releasibly connected to the mounts 30 are essentially equally spaced one from another.

Figure 5:
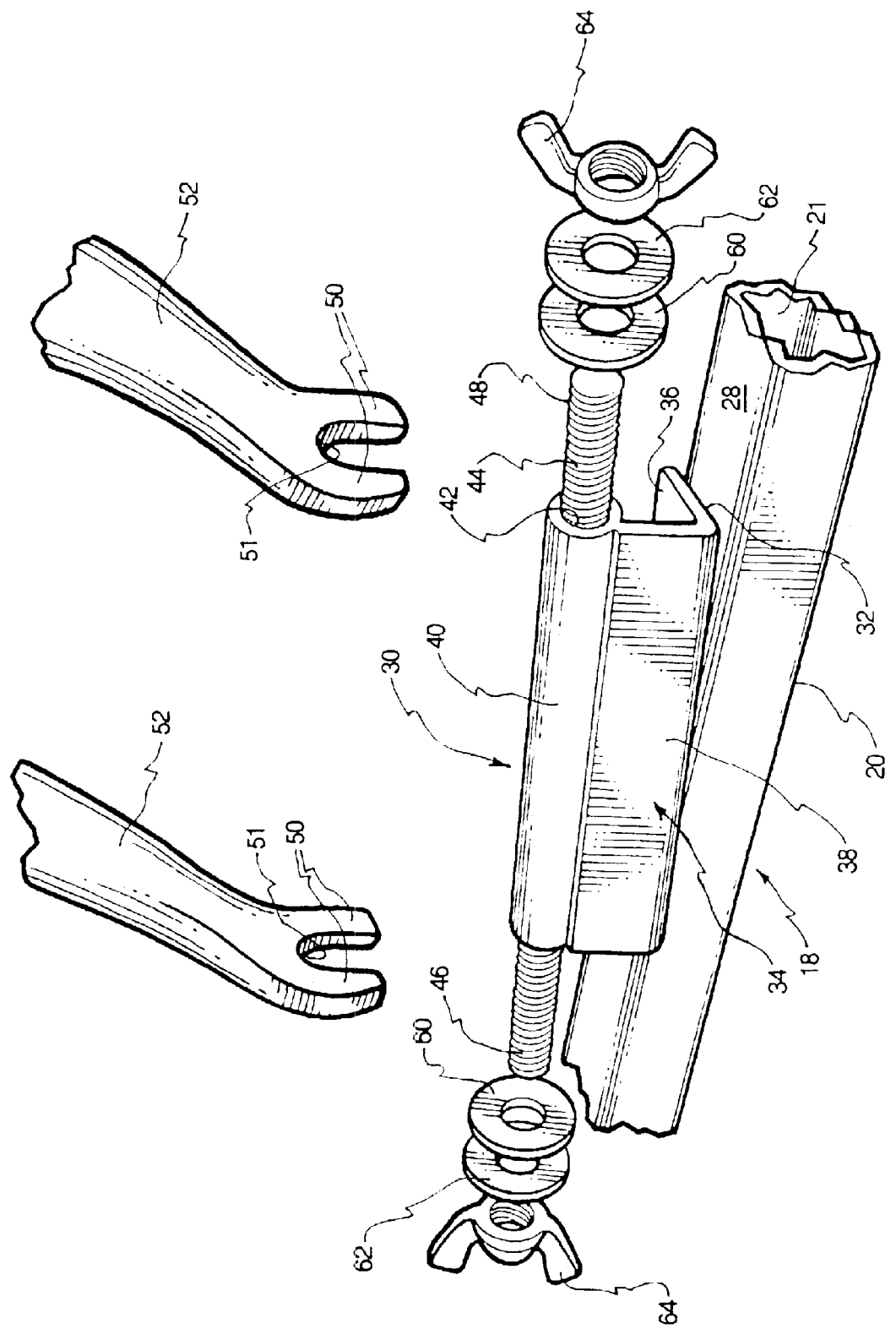
FIG. 5 is an enlarged, fragmentary exploded perspective showing a front fork plate of a bicycle in the process of being connected to a mount of the rack of FIG. 1.

As best seen in FIG. 5, the longitudinal axis between the exposed threaded ends 44 and 46 of each mount 30 is disposed at an acute angle to the longitudinal axis of the beam 18, for the purposes of preventing interference between handle bars of adjacent bicycles connected to the rack 10. This increases hauling capacity. In other words, the orientation of the axis of one handle bar is offset from and in spaced parallel relationship with the axis of the next adjacent handlebar. The acute angle between the orientation of each mount 30 and the longitudinal axis of the beam 18 may be selected by those skilled in the art so as to accomplish the objective, and avoidance of interference between handle bars.

With continued specific reference to FIG. 5, which illustrates part of the beam 18 and one mount 30, the contiguous interface 32 between the beam surface 28 and the mount 30 comprises a rigid wellment 33 (FIG. 6) securing the two parts firmly together. Each mount 30 comprises an L-shaped bracket, generally designated 34 having a base leg 36 and a second erect leg 38. Leg 38 terminates at an elongated eyelet or boss 40 comprised of a hollow-threaded interior 42. While it is preferred that each mount 30 be comprised of a suitable metal, such as steel, other materials may be used. A threaded shaft 44, comprised of threads 42 which match the threads of shaft 44, is threadedly turned through the eyelet or boss 40 into the position illustrated in FIGS. 5 and 6 so that threaded ends 46 and 48 of the shaft 44 are exposed and cantilever along the axis of the mount 30 beyond the boss or eyelet 40.

The boss 40 is illustrated as having been fabricated separately and secured to the top of the leg 38 by a wellment 39. See FIG. 6. The length of the boss 40 is preferably slightly less than the spacing between the bifurcated ends 50 of the front fork plate 52 of a bicycle 54. Space is left for the insertion of a washer 60 contiguously between the adjacent end of the boss 40 and the associated bifurcated end 50 of the associated front fork plate 52, as best illustrated in FIG. 6.

Figure 6:
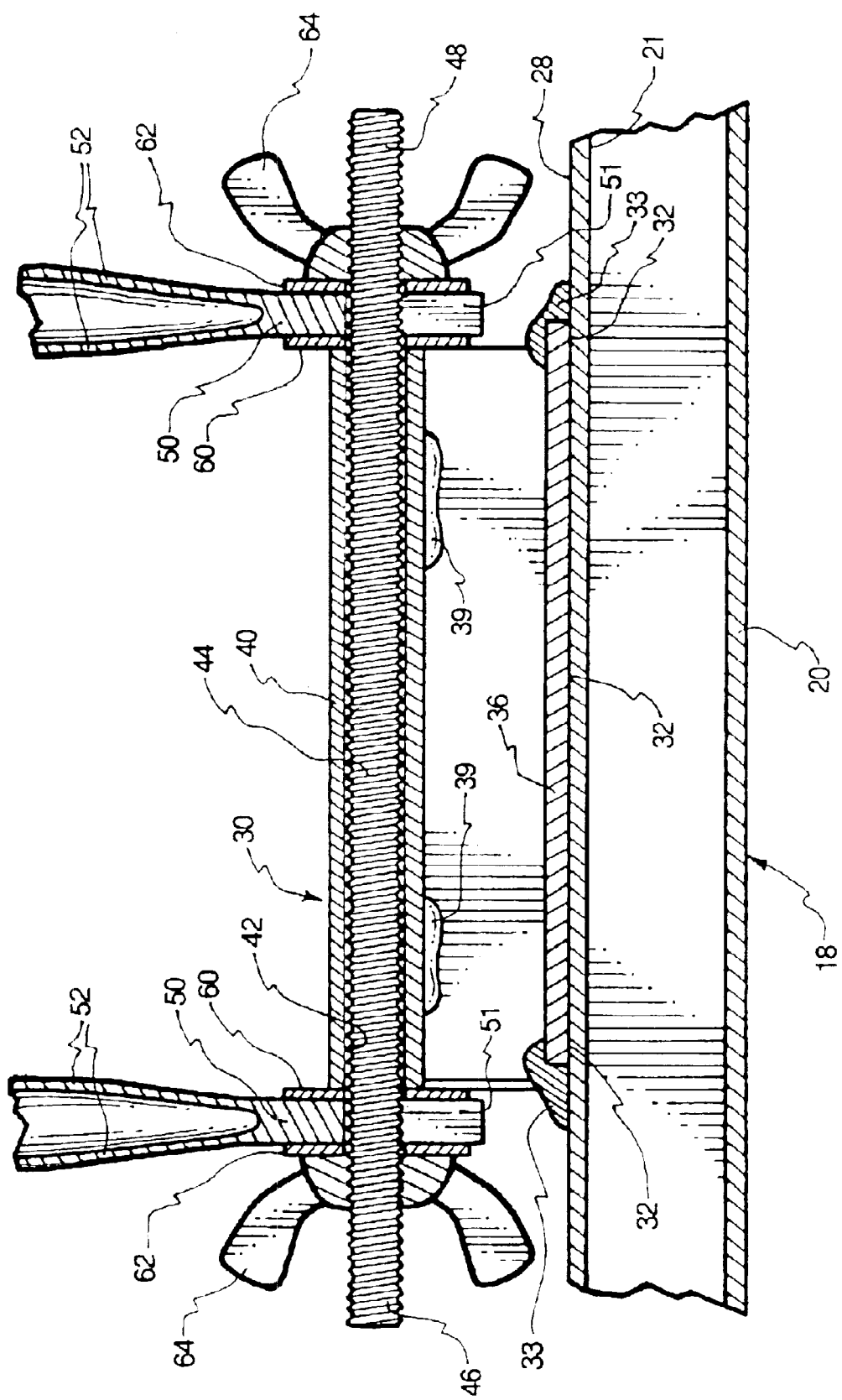
FIG. 6 is an enlarged, fragmentary cross section showing a front fork plate of a bicycle firmly mounted to the mount of the rack of FIG. 1.

After the washers 60 are in place and each bifurcated end 50 of the front fork plate 52 is inserted laterally over the exposed threaded ends 46 and 48 of the shaft 44 (as illustrated in FIG. 6), a second washer 62 is placed contiguous with the outside surface of the associated bifurcated end 50 and a wingnut 64 is threaded onto each end 46 and 48 of the shaft 44 and turned until fully tightened so that the ends 50 do not inadvertently separate from the associated mount 30 during the hauling of one or more bicycles in the bed 12 of a pickup truck, as illustrated in FIG. 2.

It should be readily apparent that because of the angular relationship between each mount 30 and the beam 18, there is no physical interference between handle bars 66 of each bicycle 54, when loaded as shown in FIG. 2. This is because the handle bars are offset one from another each, having a transverse axis parallel to the associated boss 40 and, therefore, an acute angle is formed with the transverse distance across the bed 12. The frames of the bicycles 54, shown in FIG. 2, each are positioned to be generally parallel to the front-to-back dimension of the bed 12.

Figure 3:
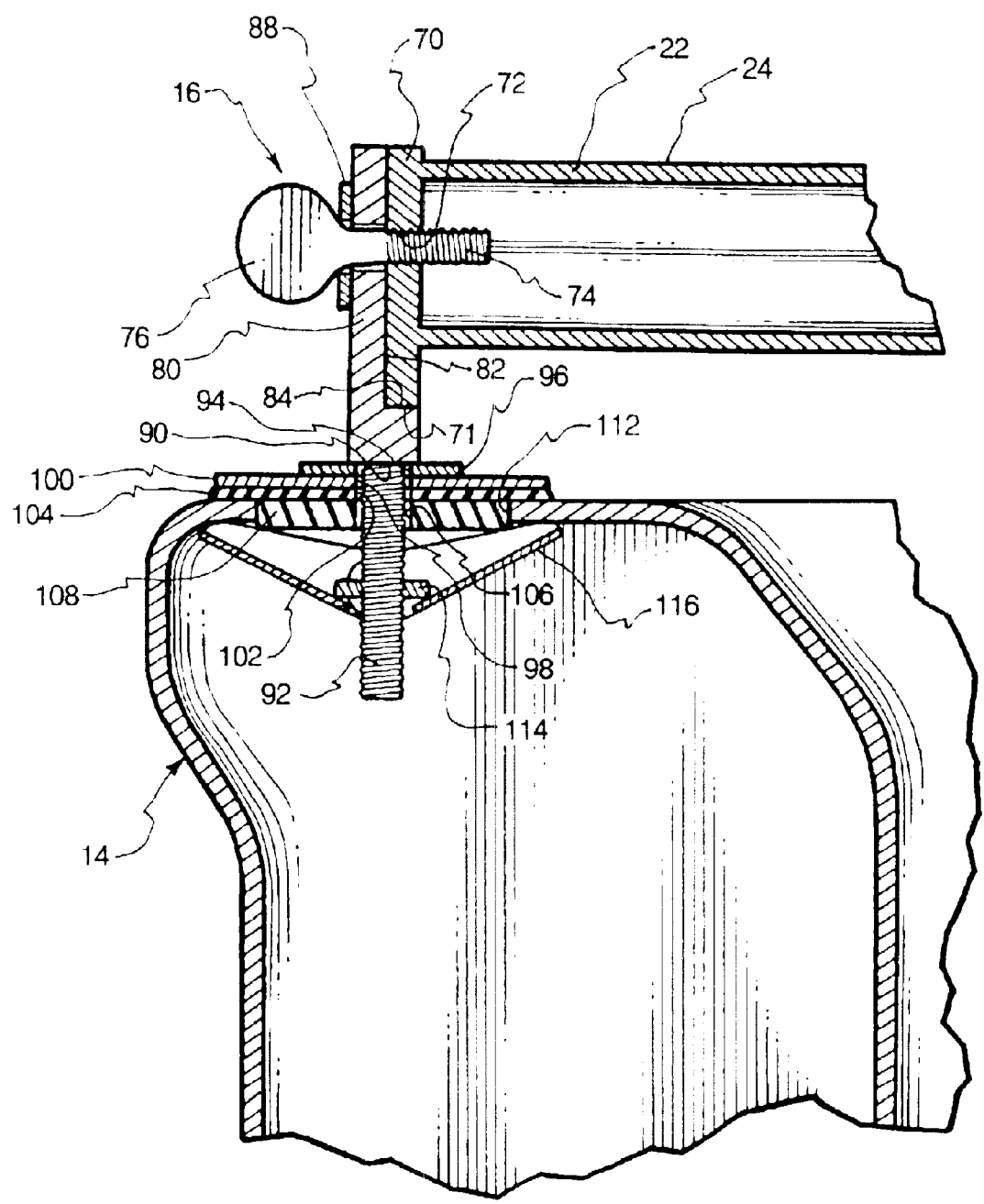
FIG. 3 is an enlarged fragmentary view showing the manner in which an end of the rack is releasibly connected to the pickup truck.
Figure 4:
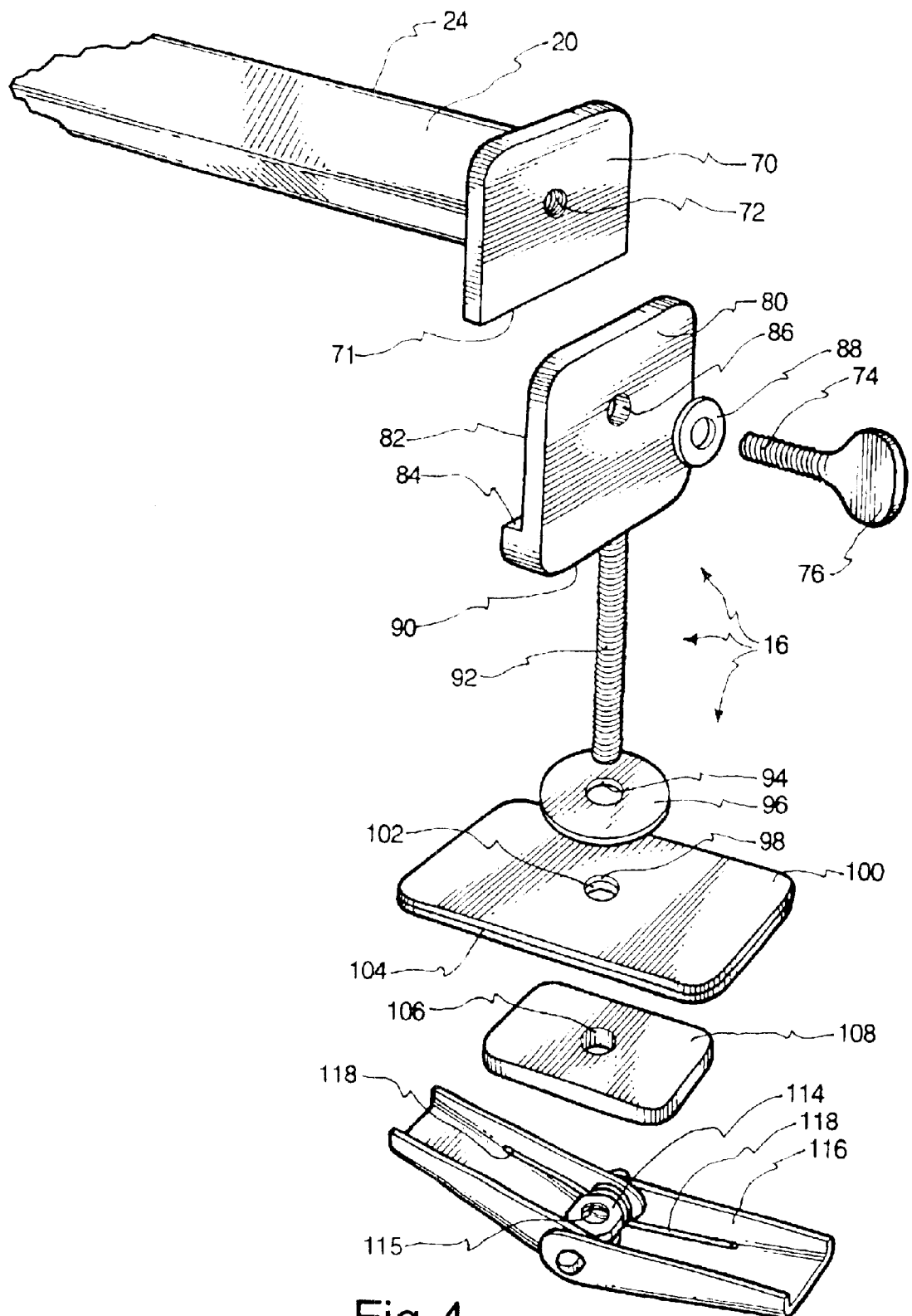
FIG. 4 is an enlarged, fragmentary exploded perspective of a connector of the type shown in FIG. 3.

As best shown in FIGS. 3 and 4, each member 20 and 22 terminates in an end plate 70, integrally connected to the associated member 20 or 22, as by welding or in some other manner. Each of the two plates 70 is centrally apertured at threaded hole 72 to receive the threaded shaft 74 of an associated thumb screw 76, in the manner explained below.

Each connector 16 comprises an L-shaped plate 80 comprised of an interior surface 82, which is contiguous with the associated plate 70, when the connector 16 is fully assembled. The interior of a plate 80 also comprises a shoulder or step 84 upon which the lower surface 71 when assembled as best illustrated in FIG. 3. Plate 80 comprises a central smooth aperture 86, the diameter of which is larger than the diameter of threaded end 74 of thumb screw 76 and aperture 72 so that threaded end 74 can be extended loosely through a washer 88 and aperture 86 and threaded into threaded aperture 72.

Integral with the bottom surface 90 of the plate 80 is a downwardly directed threaded shaft 92. Where metal components are used, the top end of shaft 92 may be welded to the associated plate 80 at surface 90. When assembled, the threaded shaft 92 passes loosely through an aperture 94 in a washer 96, through an aperture 98 in a rectangular metal plate 100, through an aperture 102 in a rectangular elastomeric washer 104, illustrated as being of the same size and integral with metal plate 100, loosely through an aperture 106 in a pressed fit rectangular washer 108, shaped to fit into an existing post hole or port 112 (FIG. 3). The shaft threads into a centrally disposed threaded aperture 115 of nut 114. Nut 114 is welded or otherwise rigidly secured centrally to a collapsible winged toggle 116.

The components shown below shaft 92 in FIG. 4 are assembled by inserting shaft 92 through the apertures 94, 98, 102, 106, and threadedly into aperture 115 before the connector 16 is caused to be associated with the post hole 112 in the bed of the pickup truck. The spring biased toggle 116 is manually collapsed and displaced in that condition through the post hole 112, after which the manual force is removed and the spring 118 causes the wings of the toggle 116 to expand to the position essentially as shown in FIG. 3. The rectangular seal 108 is sized to be force fit into post hole 112. The plate 80 and integrally attached shaft 92 are turned until the connector 16 is tight and firmly positioned as illustrated in FIG. 3. The process is repeated for the second connector 16. Thereafter, the beam 18 is positioned between the two firmly secured flanges 80 and the opposed thumb screws 76 are respectively tightened until all of the components of the rack 10 are rigidly positioned as illustrated in FIG. 2. While it is preferred that the rack 10 be positioned between post holes forward above the bed, placing it rearward above the bed will also work, should one skilled in art desire to do so.

With the rack 10 positioned as illustrated in FIG. 2, a series of four bicycles may be placed along the rack, in the illustrated embodiment, where the pickup bed has a commercially available relatively large size. This is one bike more than racks of the prior art can accommodate in the same size bed. Each bicycle is secured to the rack 18 positioned above the bed using the mounts 30 in the manner described above.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A bicycle rack adapted to be associated with a bed of a pickup truck comprising:
   a connector at each end of the rack by which the rack is connected to the pickup;
   an elongated beam, interposed between the connectors, adapted to be placed transverse of the bed, the beam having a longitudinal axis;
   a series of spaced bicycle mounts, each connected to the beam for receiving a forward portion of a bicycle, each bicycle mount comprising a longitudinal axis forming an acute angle with the longitudinal axis of the beam.

2. A rack according to claim 1 wherein each connector comprises structure for releasible attachment at an aperture in a wall defining the bed of the pickup truck.

3. A rack according to claim 1 wherein at least one connector comprises both structure for releasible attachment to the pickup adjacent to the bed and structure for releasible attachment to one end of the beam.

4. A rack according to claim 1 wherein the beam comprises telescopic interrelated members by which the length of the beam is adjusted to span the bed.

5. A rack according to claim 1 wherein at least one of the bicycle mounts is rigidly and angularly secured to the beam at a predetermined location and comprises exposed, oppositely directed threaded shaft portions for receipt of bifurcated ends of a front fork plate of a bicycle and threaded fasteners which releasible retain the bifurcated ends at the associated shaft portion.

6. A method of transporting bicycles in a bed of a pickup truck comprising the acts of:
   securing a beam across and above the bed adjacent one end of the bed;
   connecting one or more bicycles to the beam so that a frame of each of the one or more bicycles is generally parallel to bed and handle bars of each of the bicycles are disposed at an acute angle to the associated frame.

7. A method according to claim 6 wherein the connecting act comprises connecting two or more bicycles to the beam so that a frame of each bicycle is generally parallel to the bed and handle bars of each bicycle are disposed at an acute angle to the associated frame to prevent interference between the two or more handle bars.

8. A method according to claim 6 wherein the connecting act comprises releasibly fastening a front fork plate of the bicycle, with the front wheel removed, to an anchor site along the beam.

9. A method of increasing the hauling capacity for bicycles in the bed of a pickup truck comprising the acts of:

placing frames of the bicycles erect in the bed so that each extends generally parallel to the front-to-back direction of the bed;

placing a front fork and handle bars of each bicycle at an acute angle to the orientation of the bicycle frames;

firmly through releasibly securing the front forks and handle bars in said acute angular position.

* * * * *